Aug. 25, 1959

H. J. HELD ET AL 2,901,331

APPARATUS FOR FLUID CATALYTIC REACTIONS

Filed Sept. 12, 1955

*INVENTOR.*
HANS J. HELD
JOHN WEITS

BY

*Arthur H. Seidel*

ATTORNEY

Aug. 25, 1959  H. J. HELD ET AL  2,901,331
APPARATUS FOR FLUID CATALYTIC REACTIONS
Filed Sept. 12, 1955  2 Sheets-Sheet 2

INVENTOR.
HANS J. HELD
JOHN WEITS
BY Arthur H. Seidel
ATTORNEY

United States Patent Office

2,901,331
Patented Aug. 25, 1959

2,901,331

APPARATUS FOR FLUID CATALYTIC REACTIONS

Hans J. Held, Lake Success, and John Weits, Westbury, N.Y., assignors to Ducon Company, Inc., Mineola, N.Y., a corporation of New York Application September 12, 1955, Serial No. 533,853

10 Claims. (Cl. 23—288)

This invention relates to a fluid catalytic vessel or apparatus in which fluid catalytic operations are conducted; and more particularly, to a fluid catalytic vessel in which loss of the fluidized catalyst particles is minimized, and in which a relatively short starting-up period is required.

Fluid catalytic methods have gained widespread adoption in the petroleum and chemical industries. In these methods finely divided catalyst particles, such as catalyst particles having a mesh size of 80 mesh or smaller, are maintained suspended in a gas in the so-called "fluidized state" or "fluid state" during reaction conditions. While in this fluid state these particles undergo the phenomenon known as hindered settling, namely they possess many of the properties of a liquid. Thus, they may be conveyed from one vessel to another through a conduit, they develop a pressure head, etc.

The use of the fluid catalytic procedure has enabled large units to operate continuously on-stream for extended periods of time under closely controlled conditions. The catalyst inventory of such units in processes where deposition of undersirable coke or other contaminant is encountered during the reaction stage may be maintained at a predetermined level by continuously circulating the catalyst from the fluid reactor to a regenerator, where such coke or contaminant is removed, as by oxidative combustion. Thus, fluid units of enormous capacity, such as a through-put of sixty thousand barrels or more of charge per day, may operate on-stream for periods of as long as a year or more without being shut down.

Since many processes, particularly in the petroleum field employ high catalyst to charge ratios, the catalyst inventory of such systems is considerable. As many of the catalysts used in petroleum and chemical technology constitute relatively expensive materials, a close control of catalyst loss during on-stream operations must be effected. Thus, it is desirable that efficient separation of catalyst particles from the product or effluent gases from each fluid vessel be achieved. Any significant loss of catalyst particles due to entrainment with the product or effluent gases will assume extensive proportions during the continuous on-stream operation. For example, in the cracking of petroleum hydrocarbons, such as gas oil to gasoline, a change in efficiency of as little as a tenth of one percent in the means for effecting separation of the catalyst particles from the withdrawn product will mean the loss of as much as 20 to 50 tons or more of catalyst a day from the unit, depending upon its size. Inasmuch as the silica-alumina catalyst conventionally used in petroleum cracking may in the case of high grade synthetic catalyst cost more than $400.00 per ton, it can be readily appreciated that this loss of catalyst represents a tremendous financial loss in operations. Furthermore, the dispersion of such catalyst particles may lead to an air pollution problem, making satisfactory operations within a community impossible.

Moreover, the overhead expenses encountered in fluid operations are frequently considerable. Thus, with large commercial petroleum cracking units, the cost per day when the unit is off-stream as represented by the loss in overhead expenses to the refinery may run more than fifteen thousand dollars per day. It is therefore essential that a fluid vessel used in a refinery be as foolproof as possible. Furthermore, for the same reason it is desirable that the time required to place a fluid vessel on-stream be as short as possible.

The conventional means within a fluid vessel to effect separation between the catalyst particles and the exiting effluent gas is a cyclone separator in which separation of the solid particles from the effluent gas is effected by centrifugal motion, after which the solid particles are returned to the fluidized mass of particles within the fluid vessel, by a dip leg which descends into the fluid bed.

Due to the flow of gas and solid particles through the cyclone separator, a pressure differential exists between the fluid vessel and the return dip leg of the cyclone separator. This pressure differential induces gaseous reactants being treated within the fluid vessel to flow upwardly through the dip leg and into the cyclone separator, instead of through the intended path; namely, through the fluid and solid inlet in the hopper of the cyclone separator. Such upward flow through the dip leg and the cyclone separator seriously interferes with the operational efficiency of the cyclone separator and may even prevent its satisfactory operation.

Furthermore, the placing of fluid vessels in operation has required an extended starting-up period in order to establish a barometric seal between the lower portion of the cyclone separator's dip leg and the surounding vessel.

The use of a natural barometric seal constitutes the most widespread technique employed in fluid vessels at the present time and comprises submerging the lower portion of the dip leg of the cyclone separator into the dense phase fluid bed with the difference in density between the dense phase fluid bed and cyclone separator dip leg acting as a seal. While this method is fairly satisfactory, there are a number of concomitant difficulties resulting from its use. Thus, as the fluid catalyst bed levels frequently fluctuate, it is almost impossible to maintain a seal that is altogether satisfactory. Furthermore, upon start-up, it is necessary that the fluid bed be built up, and accordingly for a period of time no seal is maintained between the discharge opening of the dip leg and the dense phase fluid bed. It is therefore frequently impossible to establish a satisfactory seal between the dense phase fluid catalyst bed and the discharge opening of the dip leg, and under such circumstances the catalyst losses may be considerable.

In the past, there have been a number of unsuccessful attempts to construct fluid vessels having valves for the discharge opening of the dip leg of the cyclone separator, in order to secure a seal at the base thereof and prevent the relatively long start-up period needed when natural seals are used. However, such attempts have largely been abandoned because all prior valves have failed to operate effectively under the severe conditions encountered in actual use. For example, in the catalytic cracking of gas oil to gasoline, temperatures as high as 900 to a 1000° F. are encountered in the fluid reactor, and temperatures considerably above this level may be encountered in the fluid regenerator. Thus, due to the severe operating conditions encountered within on-stream fluid vessels, the use of machined valves to effect a seal is not practical, nor is the use of flapper valves with a pin and bearing type hinge. It has been found that the machined valve seats and/or aligning mechanisms become distorted and inoperative at high temperatures, and the build-up of carbonaceous deposits will prevent the valve plate of the valve from opening and closing satisfactorily.

It is an object of the present invention to provide a fluid vessel which will operate efficiently under greatly elevated temperatures.

It is another object of the present invention to provide a superior type of cyclone separator.

For the purpose of illustrating the invention there are shown in the drawings forms which are presently preferred; it being understood, however, that this invention is not limited to the precise arrangements and instrumentalities shown.

Reference should be had to the following drawings in which like reference characters refer to like parts:

Figure 1:
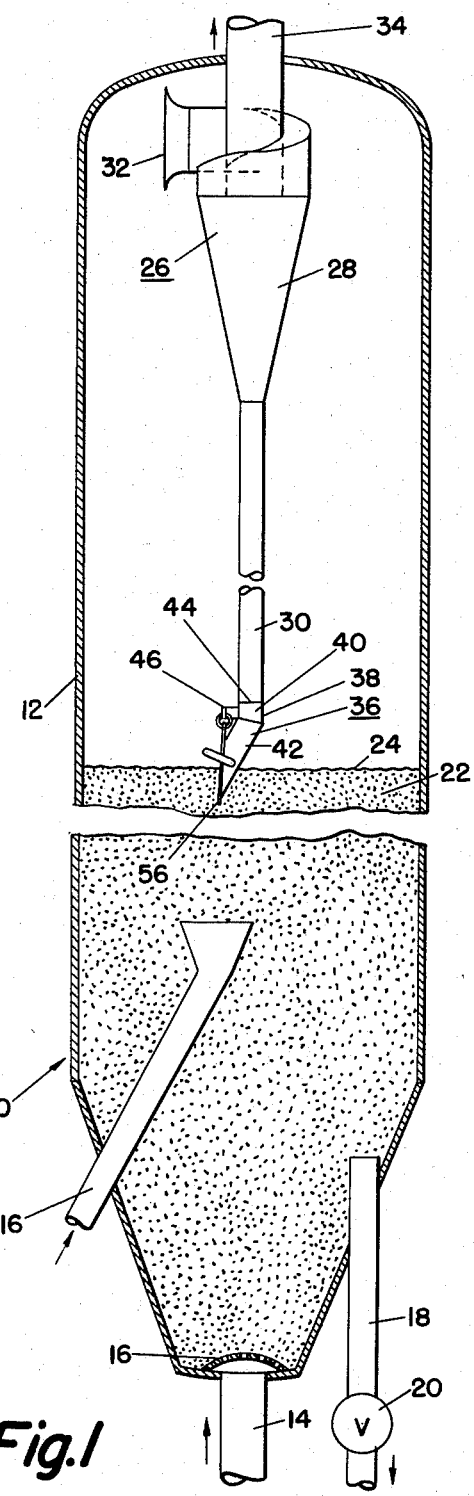
Figure 1 is a vertical section through one embodiment of the fluid vessel of the present invention.
Figure 2:
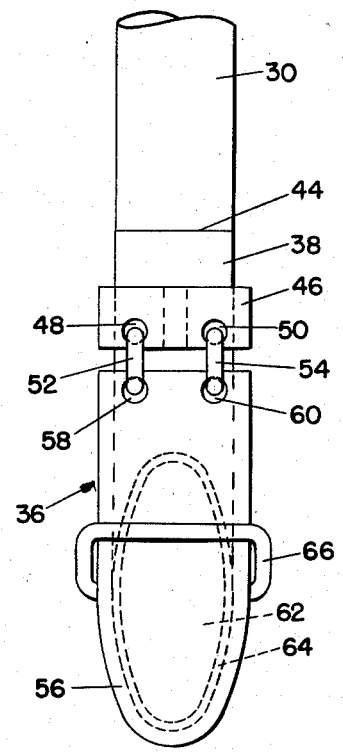
Figure 2 is an elevational view of the bottom portion of the dip leg of the cyclone separator used in the fluid vessel shown in Figure 1.

Referring to the drawings, and initially to Figures 1 and 2 the fluid vessel of the present invention is designated generally 10. Fluid vessel 10 includes a shell 12, which is provided with an inlet 14 for reactant gases, which pass through a diffusing grid 16 superposed thereabove. An inlet for introducing fluidized catalyst particles into the bed is provided by conduit 16. While only one conduit for introducing fluidized catalyst particles is shown in Figure 1, it is, of course, feasible to employ a plurality of such conduits, if the design of the vessel so requires.

The fluid vessel 10 is also provided with a catalyst outlet conduit designated 18 through which the fluidized catalyst particles may be transferred from fluid vessel 10 to another fluid vessel. Thus, if fluid vessel 10 is being employed as a reactor, the conduit 18 may be utilized to transfer the catalyst particles therefrom to either another reactor or to a regenerator. Conduit 18 may include a valve 20 for regulating the flow of catalyst particles therethrough.

The dense phase catalyst bed in fluid vessel 10 is designated 22 and has an upper level diagrammatically designated 24. Upper level 24, of course, is not a fixed zone, but is a pulsating zone resembling the upper surface of a boiling liquid. The dilute phase fluidized catalyst bed portion within fluid vessel 10 is above upper level 24.

The reaction products of the reaction transpiring within fluid vessel 10 leave fluid vessel 10 through cyclone separator 26. Cyclone separator 26 includes a conical portion 28 and a dip leg portion 30; the conical portion 28 being provided with a gas and solids inlet 32 into which the reaction products and entrained catalyst particles from the dilute phase of the fluidized catalyst bed are passed. From gas and solids inlet 32 the gaseous product and entrained solid catalyst particles are subjected to a powerful centrifugal force which urges the solid particles outwardly along the inner surface of the wall of conical portion 28, permitting the gas to rise from cyclone separator 26 through gas outlet 34, which extends through the upper portion of shell 12 of fluid reactor 10. The separated solid catalyst particles fall downwardly through conical portion 28 and dip leg 30 of cyclone separator 26.

At the lower portion of dip leg 30 these downwardly descending particles encounter trickle valve 36. Trickle valve 36 comprises a body member 38 consisting of an angularly bent conduit made up of portions 40 and 42; the upper portion 40 being a vertical continuous extension of, and welded to, the dip leg 30 along weld line 44, and the under portion 42 of body member 38 being angularly disposed to the upper portion 40.

The T-shaped support bracket 46 is welded, or otherwise fixedly secured, to the outer surface of upper portion 40 of body member 38 proximate to the junction with the lower portion 42. The head of the T-shaped support bracket 46 is a flat bar generally parallel to the axis of upper portion 40 and spaced somewhat therefrom. The T-head of bracket 46 is provided with a pair of openings 48 and 50 through which respective annular or O-shaped hinges 52 and 54 are inserted. The diameter of the openings 48 and 50 is appreciably greater than the diameter of the rod used for making O-shaped hinges 52 and 54, so that O-shaped hinges 52 and 54 may move freely through openings 48 and 50, both rotationally and laterally, notwithstanding the thermal expansion of the hinge metal at the valve operating temperature.

A flat rectangular metal valve plate 56 is carried on O-shaped hinges 52 and 54, with the O-shaped hinges 52 and 54 passing through respective openings 58 and 60 in the upper portion of valve plate 56. The diameter of openings 58 and 60 is appreciably greater than the diameter of the rod used for making O-shaped hinges 52 and 54, and permits facile rotational movement of hinges 52 and 54 therethrough, as well as lateral movement of hinges 52 and 54 therein.

Valve plate 56 seats against the discharge opening 62 of lower portion 42. Discharge opening 62 is encompassed by valve seat 64 which comprises its edge surface. Valve plate 56 has an appreciably greater area and greater maximum horizontal and vertical dimensions than valve seat 64, so that valve plate 56 may be seated against valve seat 64 in any of the plurality of its laterally disposed or vertically disposed positions. Accordingly, the disposition of O-shaped hinges 52 and 54 within openings 48 and 50 or openings 58 and 60, to the right or left of center or above or below center in respect to the centers of such openings will not adversely affect the seating of valve plate 56. The valve plate 56 may move in a plane generally parallel to the plane of valve seat 64 or at an angle to such plane, permitting facile valve operation under adverse environmental conditions. Lower portion 42 is provided with a stop 66.

In the embodiments shown in Figures 1 and 2, the plane of the outer surface of valve seat 64 in respect to the vertical is such that there is normally a contact between valve plate 56 and valve seat 64 when the former is in its neutral position induced by the force of gravity. Thus, in the embodiment shown in Figures 1 and 2 the trickle valve 36 is normally biased by gravity to a closed position.

In this embodiment valve plate 56 will remain closed until a sufficient head of material within dip leg 30 has been attained, permitting such material to be discharged through trickle valve 36. In this embodiment, a tighter seal may be achieved between the valve seat 64 and valve plate 56. A shorter dip leg 30 may be used with the catalyst within dip leg 30 having a relatively high density. More efficient classification may be achieved by the cyclone separator 26 as gas passage up the dip leg 30 is avoided.

Figures 3, 4:
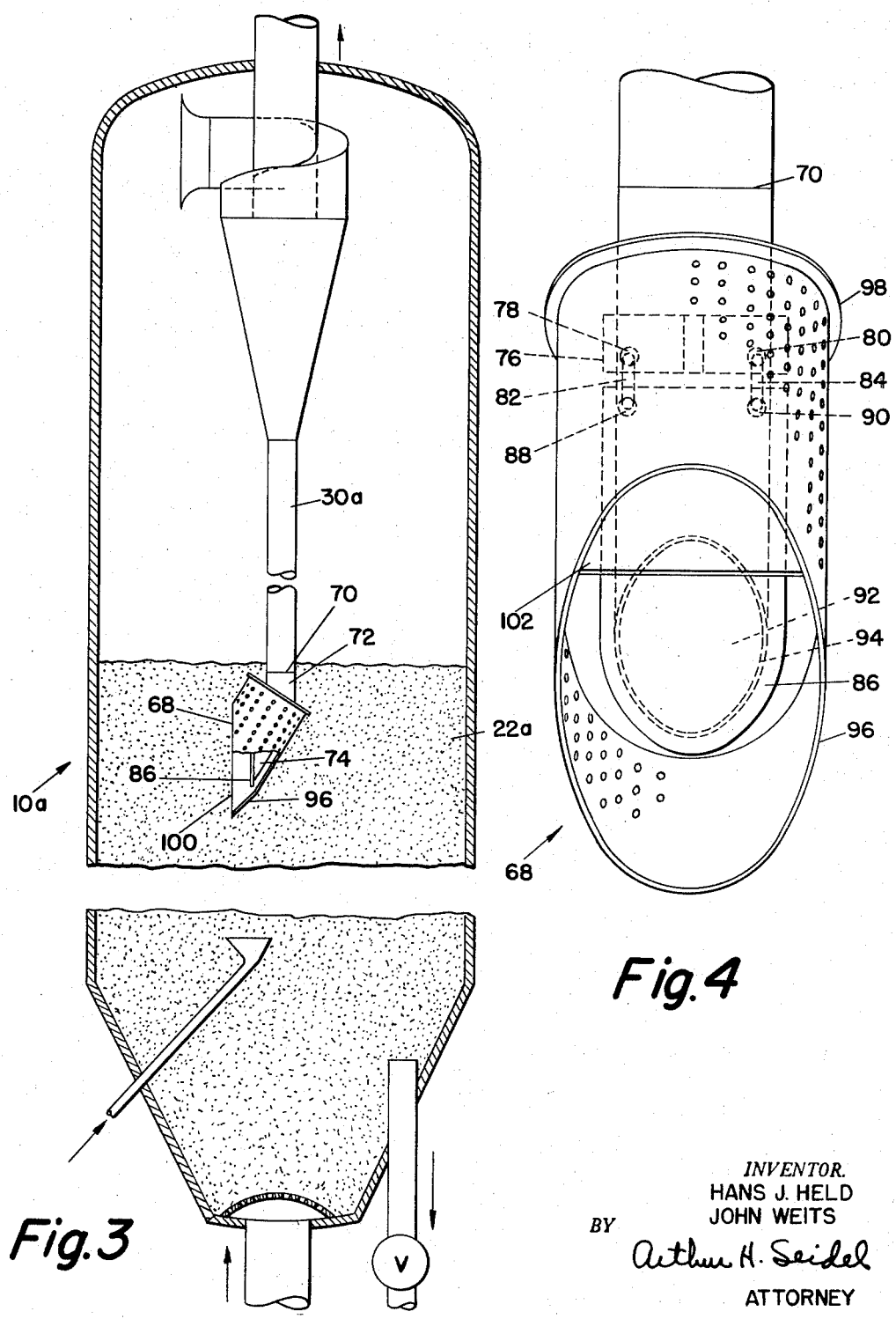
Figure 3 is a vertical elevation of another embodiment of a fluid vessel of the present invention.
Figure 4 is an elevation of the bottom portion of the dip leg of the cyclone separator used in the fluid vessel of Figure 1.

In the fluid vessel embodiment designated 10a shown in Figures 3 and 4, the fluid vessel 10a is substantially identical with fluid vessel 10 save that the dip leg 30a extends well into the dense phase fluidized catalyst bed 22a, so that the trickle-valve 68 is immersed within the dense phase fluidized bed 22a.

Trickle valve 68 is joined by line of welding 70 to the bottom of dip leg 30a. Trickle valve 68 includes an upper portion 72 which is a vertical and continuous extension of dip leg 30a, and a lower portion 74 which is angularly disposed to upper portion 72 at an angle to the vertical, the portions 72 and 74 forming a continuous conduit.

A T-shaped support bracket 76 is welded, or otherwise fixedly secured, to the outer surface of upper portion 72. The head of the T-shaped bracket 76 is a flat bar generally parallel to the axis of upper portion 72 and spaced somewhat therefrom. The T head of bracket 76 is provided with a pair of openings 78 and 80 through which respective annular or O-shaped hinges 82 and 84 are inserted. The diameters of the openings 78 and 80 are appreciably greater than the diameter of the rod used for making O-shaped hinges 82 and 84, permitting such hinges to move freely through such openings both vertically and laterally, notwithstanding the thermal expansion of the hinge metal.

Valve plate 86, which comprises a flat rectangular metallic plate, is carried on O-shaped hinges 82 and 84, with such hinges passing through respective openings 88 and 90 in the upper portion of valve plate 86. As with openings 78 and 80 the diameter of openings 88 and 90 is greater than the diameter of the rod used for making O-shaped hinges 82 and 84 permitting both facile rotational movement of hinges 82 and 84 through openings 88 and 90, and lateral movement of such hinges through such openings.

Valve plate 86 seats against the discharge opening 92 of lower portion 74, the discharge opening 92 being encompassed by valve seat 94. Valve plate 86 has an appreciably greater area, and greater maximum horizontal and vertical dimensions than valve seat 94, so that valve plate 86 may be seated against valve seat 94 in a plurality of laterally and vertically disposed positions. Accordingly, the disposition of O-shaped hinges 82 and 84 within openings 78 and 80 or openings 88 and 90, to the right or left of center or above or below center in respect to the centers of such openings will not adversely affect the seating of valve plate 86 against valve seat 94.

Upper portion 72 and lower portion 74 of trickle valve 68 are confined within a perforated tubular housing 96 having an imperforate sealing plate 98, which is fixedly and embracedly secured to the upper portion 72. Perforated housing 96 is provided with a discharge opening 100 through which particles released from discharge opening 92 may be passed to the dense phase fluid bed 22a. A stop plate 102 is provided within housing 96 and limits the backward movement of valve plate 86.

The perforated housing 96 serves to protect the remainder of trickle valve 68 from the surrounding dense phase fluidized bed, and to permit facile operation thereof, notwithstanding such surrounding dense phase fluidized bed. Thus, the perforated housing 92 materially aids in the prevention of erosion of the component elements of trickle valve 68 and facilitates the discharge of catalyst particles from discharge opening 92.

In the embodiment of the present invention shown in Figures 3 and 4, the valve plate 86 is biased by the force of gravity to an open position. Thus, there is no contact between valve plate 86 and valve seat 94 when the former is in its neutral position induced by the force of gravity. Valve plate 86 will be closed by a pressure drop in dip leg 30a, such pressure drop urging valve plate 86 against valve seat 94. When closed by such pressure drop, valve plate 86 will remain closed until there is a sufficient head of material within dip leg 30a to urge valve plate 86 away from valve seat 94, thereby permitting the material to be discharged from the discharge opening 92.

This application is a continuation in part of our application Serial No. 357,874, filed May 27, 1953, for "Trickle Valve for Dust Collectors," now abandonded.

The present invention may be embodied in other specific forms without departing from the spirit or essential attributes thereof and, accordingly, reference should be made to the appended claims, rather than to the foregoing specification as indicating the scope of the invention.

We claim:

1. A vessel for conducting fluid catalytic operations including a shell, means for introducing reactants and solid catalyst particles into said shell, means in the upper portion of said shell for discharging gaseous product therefrom, separation means for separating gaseous product from solid catalyst particles in communication with said last-mentioned means, said separation means including a cyclone separator, said cyclone separator having a dip leg depending into the interior of said shell, said cyclone separator having fixedly secured to the lowermost end of its dip leg a trickle valve, said trickle valve including a bracket fixedly secured to the outer surface of said dip leg, said bracket having a plurality of openings therein, an annular hinge in each said opening formed from a rod having a core thickness appreciably less than the inner diameter of the opening in which said hinge is received, a valve plate, said hinges passing through openings in the upper portion of said valve plate whereby said valve plate is suspended from said hinges on the outside of said dip leg with said valve plate juxtaposed to the mouth of said dip leg, the openings in said valve plate having an inside diameter appreciably larger than the core thickness of the rod forming said hinges, the diameter of the openings in said bracket and valve plate being so much larger than the core thickness of the rod forming the hinges as to permit both lateral and rotational movement of said hinges through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position the discharge opening of said dip-leg being so positioned in respect to the valve plate that gravity biases the valve plate away from the edge of the discharge opening.

2. A vessel for conducting fluid catalytic operations including a shell, means for introducing reactants and solid catalyst particles into said shell, means in the upper portion of said shell for discharging gaseous product therefrom, separation means for separating gaseous product from solid catalyst particles in communication with said last-mentioned means, said separation means including a cyclone separator, said cyclone separator having a dip leg depending into the interior of said shell, said cyclone separator having fixedly secured to the lowermost end of its dip leg a trickle valve, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position, the discharge opening of said dip leg being so positioned in respect to the valve plate that gravity biases the valve plate away from the edge of the discharge opening, and a stop for limiting the movement of said valve plate away from the discharge opening.

3. A vessel for conducting fluid catalytic operations involving a dense phase fluidized bed including a shell, means for introducing reactants and solid catalyst particles into said shell, means in the upper portion of said shell for discharging gaseous product therefrom, separation means for separating gaseous product from solid catalyst particles in communication with said last-mentioned means, said separation means including a cyclone separator, said cyclone separator having a dip leg depending into the interior of said shell, said cyclone separator having fixedly secured to the lowermost end of its dip leg a trickle valve, said trickle valve being suspended well below the uppermost level of the dense phase fluidized bed, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position, the discharge opening of said dip-leg being so positioned in respect to the valve plate that gravity biases the valve plate away from the edge of the discharge opening, and an open-ended perforated housing surrounding said valve plate and the portion of said dip leg adjacent and including the discharge opening, the open end of said perforated housing being in communication with the discharge opening, and a stop member in said perforated housing juxtaposed to the face of the valve plate opposite the valve plate face that is juxtaposed to the discharge opening for limiting the movement of the valve plate away from the discharge opening.

4. A vessel for conducting fluid catalytic operations including a shell, means for introducing reactants and solid catalyst particles into said shell, means in the upper portion of said shell for discharging gaseous product therefrom, separation means for separating gaseous product from solid catalyst particles in communication with said last-mentioned means, said separation means including a cyclone separator, said cyclone separator having a dip leg depending into the interior of said shell, said cyclone separator having fixedly secured to the lowermost end of its dip leg a trickle valve, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, with the discharge opening of said dip leg being so positioned in respect to the valve plate that gravity biases the valve plate away from the edge of the discharge opening, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position.

5. In a cyclone separator, a collector, a dip leg dependent therefrom, a trickle valve fixedly secured to the lowermost end of the dip leg, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed positon, and said juxtaposed face of the valve plate being disposed away from the edge of the discharge opening of said dip leg when the valve plate is disposed in its open position.

6. In a cyclone separator, a collector, a dip leg dependent therefrom, a trickle valve fixedly secured to the lowermost end of the dip leg, said trickle valve including a bracket fixedly secured to the outer surface of said dip leg, said bracket having a plurality of openings therein, an annular hinge in each said opening formed from a rod having a core thickness appreciably less than the inner diameter of the opening in which said hinge is received, a valve plate, said hinges passing through openings in the upper portion of said valve plate whereby said valve plate is suspended from said hinges on the outside of said dip leg with said valve plate juxtaposed to the mouth of said dip leg, the openings in said valve plate having an inside diameter appreciably larger than the core thickness of the rod forming said hinges, the diameter of the openings in said bracket and valve plate being so much larger than the core thickness of the rod forming the hinges as to permit both lateral and rotational movement of said hinges through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position.

7. In a cyclone separator, a collector, a dip leg dependent therefrom, a trickle valve fixedly secured to the lowermost end of the dip leg, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position, and a stop for limiting the movement of said valve plate away from the discharge opening.

8. In a cyclone separator, a collector, a dip leg dependent therefrom, a trickle valve fixedly secured to the lowermost end of the dip leg, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position, and an open-ended perforated housing surrounding said valve plate and the portion of said dip leg adjacent and including the discharge opening, the open-end of said perforated housing being in communication with the discharge opening, and a stop member in said perforated housing juxtaposed to the face of the valve plate opposite the valve plate face that is juxtaposed to the discharge opening for limiting the movement of the valve plate away from the discharge opening.

9. In a cyclone separator, a collector, a dip leg dependent therefrom, a trickle valve fixedly secured to the lowermost end of the dip leg, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, with the discharge opening of said dip leg being so positioned in respect to the valve plate that gravity biases the valve plate to seat against the edge of the discharge opening, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate being disposed away from the edge of the discharge opening of said dip leg when the valve plate is disposed in its open position.

10. In a cyclone separator, a collector, a dip leg dependent therefrom, a trickle valve fixedly secured to the lowermost end of the dip leg, said trickle valve including a bracket fixedly secured to the outer surface of said dip leg, said bracket having an opening therein, a closed loop hinge formed from a rod having a core thickness appreciably less than the inner diameter of said opening, said hinge being mounted through the opening in said bracket, a valve plate, said hinge passing through an opening in the upper portion of said valve plate whereby said valve plate is suspended from said hinge on the outside of said dip leg with said valve plate juxtaposed to the mouth of said dip leg, the opening in said valve plate having an inside diameter appreciably larger than the core thickness of the rod forming said hinge, the diameter of the openings in said bracket and valve plate being so much larger than the core thickness of the rod forming the hinge as to permit both lateral and rotational movement of said hinge through each of said openings, with the discharge opening of said dip leg being so positioned in respect to the valve plate that gravity biases the valve plate away from the edge of the discharge opening, the width and length of said valve plate being appreciably greater than the maximum width and length dimensions of the discharge opening of said dip leg, the face of the valve plate juxtaposed to the discharge opening of said dip leg seating against the edge of the discharge opening of said dip leg when said valve plate is disposed in its closed position, and said juxtaposed face of the valve plate disposed away from the edge of the discharge opening of said dip leg when the valve plate is disposed in its open position.

References Cited in the file of this patent

UNITED STATES PATENTS

| Number | Name | Date |
|---|---|---|
| 274,139 | Pietsch | Mar. 20, 1883 |
| 1,635,842 | Hirschstein | July 12, 1927 |
| 2,134,012 | Trowbridge | Oct. 25, 1938 |
| 2,612,437 | Kaulakis | Sept. 30, 1952 |
| 2,667,448 | Munday | Jan. 26, 1954 |
| 2,698,224 | Brooke | Dec. 28, 1954 |

FOREIGN PATENTS

| Number | Country | Date |
|---|---|---|
| 595,013 | Great Britain | 1947 |
| 695,589 | Great Britain | 1953 |